United States Patent
Seipel et al.

(10) Patent No.: US 6,457,947 B1
(45) Date of Patent: Oct. 1, 2002

(54) PISTON COMPRESSOR FOR REFRIGERANT, WITH THERMAL INSULATION

(75) Inventors: Volker Seipel, Bensheim; Jan Hinrichs, Friedrichsdorf, both of (DE)

(73) Assignee: LUK Fahrzeug-Hydraulik GmbH & Co. KG, Bad Homburg (DE)

( * ) Notice: Subject to any disclaimer, the term of this patent is extended or adjusted under 35 U.S.C. 154(b) by 0 days.

(21) Appl. No.: 09/486,599

(22) PCT Filed: Aug. 31, 1998

(86) PCT No.: PCT/DE98/02559

§ 371 (c)(1),
(2), (4) Date: Apr. 6, 2000

(87) PCT Pub. No.: WO99/11929

PCT Pub. Date: Mar. 11, 1999

(30) Foreign Application Priority Data

Aug. 29, 1997  (DE) .......................... 197 37 887
Sep. 23, 1997  (DE) .......................... 197 41 979

(51) Int. Cl.$^7$ .......................... F04B 1/12; F04B 35/00; F01B 3/00; F16D 7/02

(52) U.S. Cl. ................. 417/269; 417/319; 417/DIG. 1; 92/71; 192/56.5

(58) Field of Search .................. 417/362, 319, 417/269, DIG. 1; 92/71, 248, 223, 169.1; 192/56.5, 56.1, 82 T

(56) References Cited

U.S. PATENT DOCUMENTS

| | | | | | |
|---|---|---|---|---|---|
| 2,413,751 | A | * | 1/1947 | Dennis | 121/1 |
| 2,508,061 | A | * | 5/1950 | Fish | 192/56 |
| 2,511,518 | A | * | 6/1950 | Stephens | 192/105 |
| 2,539,534 | A | * | 1/1951 | Eckhardt | 318/473 |
| 3,552,370 | A | * | 1/1971 | Briggs | 123/191 |
| 4,074,671 | A | * | 2/1978 | Pennila | 123/169 |
| 4,132,300 | A | * | 1/1979 | Grandia | 192/82 T |
| 4,371,319 | A | | 2/1983 | Murayama et al. | |
| 4,519,119 | A | * | 5/1985 | Nakayama et al. | 29/156.5 R |
| 5,219,273 | A | * | 6/1993 | Chang | 417/319 |
| 5,354,608 | A | | 10/1994 | Keelan et al. | |
| 5,542,824 | A | | 8/1996 | Lee | |

FOREIGN PATENT DOCUMENTS

| | | |
|---|---|---|
| EP | 0 411 195 A1 | 2/1991 |
| EP | 0 505 805 A2 | 9/1992 |
| WO | WO 93/01412 A1 | 1/1993 |
| WO | 93-01412 * | 1/1993 |

* cited by examiner

Primary Examiner—Charles G. Freay
Assistant Examiner—Timothy P. Solak
(74) Attorney, Agent, or Firm—Alston & Bird LLP

(57) ABSTRACT

A compressor for an air conditioning system in an automobile, having a housing (1) and a compressor unit (2) accommodated in the housing (1) for taking in and compressing a refrigerant. The refrigerant flows from an intake area (4) preferably in a front-end housing cover (3) through the compressor unit (2) into a discharge area (5), preferably likewise designed and constructed in the housing cover (3). The compressor is designed and constructed for promoting efficiency such that components coming into contact with the refrigerant, particularly the walls forming a flow path (6) between the intake area (4) and the discharge area (5) are thermally insulated against the refrigerant at least partially and in areas of contact. For an effective protection of the drive belt when the drive shaft or the compressor unit locks, the compressor is further designed and constructed such that a coupling device automatically disengages, when a defined thermal and/or mechanical load limit is exceeded.

18 Claims, 5 Drawing Sheets

PISTON COMPRESSOR FOR REFRIGERANT, WITH THERMAL INSULATION

BACKGROUND OF THE INVENTION

The invention relates to a compressor, in particular for the air conditioning system of an automobile, with a housing and a compressor unit accommodated in the housing for taking in and compressing a refrigerant, the refrigerant flowing from an intake area preferably formed in a front-end housing cover through the compressor unit into a discharge area preferably likewise formed in the housing cover.

In most cases, compressors of the kind under discussion are named air-conditioning compressors, and are known from practice in a large variety of types of construction. Such compressors comprise a housing, which encloses an externally operated compressor or pump unit. The pump unit that is designed and constructed, for example, as an axial piston pump, comprises in turn at least one piston that is adapted for reciprocal movement in a cylinder block. Normally, such a compressor is equipped with a plurality of pistons and operates by the swash plate or pivot disk principle. When rotating a swash plate, the pistons will reciprocate in the direction of their longitudinal axis, with a receiving disk being nonrotatably supported in the housing.

Air-conditioning compressors of a large variety of types operate with a refrigerant. Besides conventional refrigerants, whose use appears to become more and more critical in the light of an increasing awareness of the environment, it is possible to use as a refrigerant an inert gas, such as, for example, $CO_2$, which is noncritical under environmental aspects. However, the use of such a refrigerant leads to higher pressures within the compressor, thereby necessitating quite special constructional measures, for example, with respect to the selection of material and wall thickness of the housing.

The use of a high-strength material for the housing of the compressor makes it easy to absorb as early as in the intake state the high pressures necessary or occurring in the case of a refrigerant having a high density. For example, it is thus necessary to withstand bursting pressures of up to 30 MPa at discharge temperatures of up to about 160° C. to 170° C.

As aforesaid, compressors of the kind under discussion comprise an intake area and a discharge area. Whereas on the suction side, in the intake area, the refrigerant flows in at a temperature mostly ranging from 30° C. to 400, the temperatures on the pressure side, i.e., discharge area, are in a range from 80° C. to about 170° C.

Normally, compressor housings are made of metal, for example, aluminum, of high-quality steel, or of a high-tensile steel. Consequently, the high temperature in the discharge area is bound to become effective on the intake area to the extent that same is heated via the housing material coming into contact with the refrigerant, as well as the interiors of the compressor. As a result, the gaseous refrigerant is heated on the intake side, whereby its density decreases. This again leads to a loss in delivery or a reduction of the mass flow of the refrigerant and, thus, to a loss in output of the compressor. Because of the temperature influence by the discharge area on the intake area, the efficiency of a conventional compressor is considerably reduced.

A further concept of the invention relates to a compressor, in particular for the air conditioning system of an automobile, wherein a belt drives the compressor unit via a drive wheel coupled with the drive shaft, and wherein the drive wheel comprises a belt pulley body engaging the belt, the belt pulley body being coupled via a coupling device directly or indirectly with the drive shaft.

The compressors under discussion are driven via a belt, which is guided over a belt pulley hereafter drive wheel. The belt in turn is driven via the crank shaft of the internal combustion engine of an automobile.

Malfunctions may occur in the operation of the compressor. Thus, for example, the compressor unit or the drive shaft may block. If the belt loops about the drive wheel at a very small angle, the belt is expected to slip on the drive wheel or the belt pulley. In this instance, the drive wheel will heat up very considerably. This leads after a short time to damage and finally to destruction of the belt, so that even the subassemblies that are driven by the belt, for example the water pump or alternator, can no longer be operated. As a result, the automobile is no longer operable.

If the belt loops about the drive wheel or belt pulley at a larger angle, for example, more than 180°, it is hardly possible that the belt slips on the drive wheel or belt pulley. This leads either to a tearing of the belt or to a choking of the engine. Likewise, in such an instance, the automobile is no longer operable.

To avoid the above-described problems, an electromagnetic clutch has already been integrated in the drive wheel of the compressor. Should the belt slip or should the clutch halves slip, the clutch will undergo a very considerable heating. If a predetermined temperature is reached, a safety fuse will interrupt the coil current, and the clutch disengages the compressor, so that the belt can continue to move with the belt pulley body of the drive wheel. This ensures the operation of safety-relevant components of the automobile, for example the water pump and/or the alternator, which are likewise driven by this belt.

However, the electromagnetic clutch as known from practice, is problematic, inasmuch as it is constructed relatively large, expensive with respect to its individual components, and represents a quite considerable cost factor. Primarily, due to its complexity, such an electromagnetic clutch causes an extraordinary weight load, which is diametrically opposite to a weight reduction as is constantly sought in the current automobile construction. Because of its enormous overall size, the compressor is not suitable for installation in small engine compartments.

From the practice alone, it is already known to provide an overload clutch with a disk-shaped rubber body having an external gear tooth system, whose gear teeth shear in the event of excessive stress. In this case, the clutch is a purely mechanical overload clutch, whose disengagement behavior can be defined only in a certain bandwidth. At any rate, such an overload clutch is barely reliable.

It is the object of the present invention to improve and further develop a compressor of the initially described kind such that its efficiency becomes more favorable in comparison with conventional compressors, that the compressor is constructed smaller, that its weight is reduced, and that accordingly it is easier and less expensive to manufacture the compressor. Furthermore, it is an object to increase output and to ensure at a lesser expense at least the same safety, in particular a protection of the belt drive and the internal combustion engine, as in the case of compressors known until now.

SUMMARY OF THE INVENTION

The above and other objects and advantages of the present invention are achieved by the provision of a compressor of the described type wherein the components coming into contact with the refrigerant, and specifically the interior walls of the intake area and the discharge area, are thermally insulated against the refrigerant at least partially and in areas of contact.

To begin with, it has been recognized by the present invention that the high temperature difference between the discharge area and intake area of a conventional compressor of the kind under discussion leads to a decrease of efficiency, due to a heating of the intake area and the refrigerant because of the thermal conductivity of the compressor components.

Furthermore, it has been recognized by the present invention that the here-analyzed problems can be lessened, in that components coming into contact with the refrigerant are thermally insulated to a certain degree, so that the heating of the refrigerant is at least reduced. To this end, the walls forming the flow path between the intake area and the discharge area are thermally insulated against the refrigerant at least slightly in areas of contact. The definition "thermal insulation" does here not mean a complete insulation for avoiding a heat transfer. Instead, it means a reduction of the thermal conductivity from components of the compressor to the refrigerant by means of passive measures. In this connection, a thermal insulation provided in areas of contact will already decrease heating of the taken-in refrigerant and, thus, increase the efficiency of the compressor.

Concretely, the heat insulation could be realized as a lining of a material having a low thermal conductivity. Accordingly, the lining is applied to the walls forming the flow path within the compressor. In this connection, even a partial lining in the intake area will already turn out to be quite successful.

With respect to a particularly simple construction of the compressor, it would be possible to realize the thermal insulation as a coating of a material having a low thermal conductivity. In this instance, conventional coating techniques are considered, which require that the material be resistant to temperatures in a range up to 170° C. ETFE (ethylene tetrafluoroethylene) is an example of such a material and which serves as well as a protection against wear and tear.

Within the scope of a particularly simple construction of the compressor, the thermal insulation is provided on the inside wall of the intake channel. This permits reducing a heating of the taken-in refrigerant already on the intake side. To further reduce a heating of the taken-in refrigerant, the thermal insulation is provided in a quite particularly advantageous manner on the inside wall of the entire intake area, thereby decreasing again a heating of the refrigerant sucked in in the intake area.

If one departs from the fact that both the intake area and the discharge area are formed in a housing cover, often also named pressure cover, it would be possible to provide the thermal insulation likewise on the inside wall of the discharge channel, or even on the inside wall of the entire discharge area. This means, one could provide the entire inside wall of the housing cover with a corresponding thermal insulation. To this extent, it would be possible to treat the thermal insulation uniformly on the entire inside wall of the housing cover, or apply it thereto uniformly in the case of a coating.

As previously mentioned, it would be possible to realize the thermal insulation in the form of a lining. To this extent, it is especially advantageous to realize the lining within the housing cover in the form of a loose insert, so that this insert defines the flow path for the refrigerant.

For a further reaching reduction of the thermal conductivity between the housing cover and refrigerant, it would be possible to space the lining at least slightly from the inside wall of the housing cover, so that a space remains between the actual inside wall of the housing cover and the lining. This interspace decreases again the heat transfer between the housing cover and the refrigerant.

Concretely, the lining could lie against the inside wall of the housing cover with partially shaped, preferably integral spacers, so that the spacing between the insert and the inside wall of the housing cover is not decreased because of the inflowing refrigerant.

As a further alternative, it would be possible to realize the lining or coating in the form of a porous foam, whereby a gaseous cushion within the foam leads to a reduction of the heat transfer between the inside wall of the housing cover and the refrigerant. It is preferred that the foam have an open porosity, so that its structure is not destroyed in the event of occurring pressure differences.

As previously mentioned, it would also be possible to coat the inside wall of the housing cover as a whole, namely all over, where the flow path of the refrigerant is defined by the inside wall of the housing cover. Within the scope of such a coating, it is also possible to impart to same a surface structure that promotes the flow, for example to provide there a defined roughness, which may have the surface structure of a shark skin. At any rate, such a measure is able to promote the flow within the intake and discharge areas.

Likewise, it is possible to provide the inside wall of the housing cover only with a rough finish, and to realize the required surface structure by the coating. Thus, for example, it would also be possible to smooth by means of a suitable coating material the surface of the inside wall of the housing cover, which is too rough for the flow of the refrigerant.

In the case of the compressors under discussion, the housing cover comprising the intake and discharge areas abuts a valve plate, so that the flow path of the refrigerant is defined at least in part between the valve plate and the inside wall of the housing cover. To this extent, it will be of further advantage, when the thermal insulation is also provided on the valve plate. To this end, it would be possible to coat the valve plate on its side facing the housing cover, as may also be done with the inside wall of housing cover.

As an alternative, it is also possible, as in the case of the inside wall of the housing cover, to apply a loose insert to the valve plate on its side facing the housing cover. Moreover, this insert can also be effective in the way of a seal at least in the edge region and in transitional regions between the valve plate and the housing cover.

The foregoing description relates to a reduction of the thermal conductivity between the inside wall of the housing cover and refrigerant. However, it is possible to further reduce a heating of the refrigerant in that surfaces in the pump unit, which additionally form the flow path, or adjoin the flow path, are coated with a material of a low conductivity. To such a coating, it would be possible to attach directly two functions, namely, on the one hand the attempted reduction of a heat transfer between the component of the compressor and the refrigerant, and on the other hand the application of a protective coating against wear and tear for lengthening the service life of the compressor.

If the pump unit is designed and constructed as an axial piston pump, it will be possible to coat the working surface of the cylinder in the cylinder block with the material of a low conductivity. A thermal insulation applied thereto, which simultaneously serves as a protective coating against wear and tear, will be exceptionally advantageous due to the mechanical stress normally occurring in this region.

Furthermore, it is possible to coat the surface of the piston likewise with the low-conductivity material, where the coating serves at the same time as a protection against wear and tear.

Regardless of the foregoing measures for reducing a heat transfer between components of the compressor and the refrigerant by means of a lining or coating, a further measure for reducing the heat transfer could lie in that the housing cover itself is made of a material having a low thermal conductivity. In this connection, the housing cover could consist of a metal having a low thermal conductivity, for example, a high tensile steel, which exhibits a yet considerably lower thermal conductivity than aluminum. In a very advantageous manner, the housing cover is made of a ceramic material or ceramic composite, which reduces the heat transfer quite considerably, even without a coating or lining of the flow path.

A further, partial aspect of the object is accomplished by the provision of a compressor whose compressor unit is driven by a belt via a drive shaft and a drive wheel coupled therewith, and wherein the drive wheel comprises a belt pulley body engaging the belt and which is directly or indirectly coupled with the drive shaft via a coupling device, the coupling device is configured to automatically disengage when a defined thermal and/or mechanical load limit is exceeded.

To this extent, it has been recognized by the present invention that the disengagement has to occur automatically, namely upon exceeding a defined thermal load limit, a defined mechanical load limit, or upon exceeding selectively one of the two foregoing load limits. Ultimately, the intent here is to ensure that an automatic disengagement occurs by all means. In this connection, it is possible to predetermine the kind of the load limit to be exceeded as well as the amount of the load capacity.

With that, it is intended to avoid by all means that a locking of the compressor unit or the drive shaft leads to damage to the belt. Lastly, it is intended to accomplish that, even when the compressor unit or the drive shaft locks, the belt is able to continue to run more or less unimpeded, with only the compressor being inoperative due to the occurred defect.

Concretely, the coupling device that engages in the normal operation of the compressor, could comprise a coupling element that is operative between the belt pulley body and a coupling disk engaging the drive shaft. This coupling element is responsible for the actual engagement and, thus, for the drive of the compressor unit. In particular, also with respect to a small overall size, it will of advantage, when the coupling element is arranged between the inside surface of the belt pulley body and the outside surface of the coupling disk. In such a case, the two surfaces, i.e. the inside surface of the belt pulley body and outside surface of the coupling disk, are arranged in coaxial relationship with each other. In other words, the belt pulley body serving to receive the belt extends substantially annularly around the coupling disk. In this arrangement, both the belt pulley body and the coupling disk have two adjacent and parallel extending surfaces. Arranged therebetween is the coupling device with the coupling element.

Furthermore, it would be possible to provide between the coupling element and the coupling disk or a drive flange of the compressor unit, a vibration damper associated to the coupling device for damping rotary vibrations. This damper may be an elastomeric element or a rubber-metal element. With respect thereto, the coupling device may comprise the coupling element on the one hand and the vibration damper on the other. However, the component used for disengaging is the coupling element.

There exist numerous possibilities of concretely designing and constructing the coupling element, with the latter having to effect a defined disengagement, when a thermal and/or mechanical load limit is exceeded. To this end, it would be possible to design and construct the coupling element as a spring, which loses at least in part its elasticity under a temperature influence above a predetermined limit value of the temperature, and disengages in this process. Thus, the coupling realized by its elasticity is eliminated by a quasi fatiguing of the spring. In this connection, the spring may easily assume a double function, insofar as the spring also permits a disengagement, when a mechanical load limit is exceeded, namely, by acting in the fashion of a slipping clutch. Both modes of operation are possible, namely a disengagement when a thermal and a mechanical load limit are exceeded.

Likewise, it is possible to construct the coupling element as a permanent magnet cooperating with the magnetic material of the belt pulley body and coupling disk. This permanent magnet would have to loose its magnetic effect at least in part under a temperature influence above a predetermined limit value, and disengage in this process. In this respect, a disengagement would be ensured, when a definable, thermal load limit is exceeded.

The provision of a magnetically operating coupling device could also perform a formlocking engagement, namely in that the coupling element comprises magnetic coupling parts adapted for a formlocking engagement, as well as an at least weak electromagnet, which disengages the coupling parts, when a blocking of the drive shaft is detected. Such a provision presents itself at least when the compressor is electrically controlled, i.e., when it is easy to detect the blocking of the compressor.

Within the scope of a very advantageous development, the coupling element is designed and constructed in the way of an annular pressure body for a frictional engagement between the belt pulley body and the coupling disk or drive shaft. Due to its pressed state between the components, this pressure body effects a frictional engagement. In the case that a vibration damper is provided in addition, the coupling element and, thus, the pressure body are arranged between the belt pulley body and the vibration damper. At any rate, the pressure body is operative between the belt pulley body and the drive shaft, in each case via those components that are arranged therebetween from a functional viewpoint.

Concretely, the pressure body could be realized in the form of bellows, preferably thin-walled metal bellows. A thin-walled construction would be of advantage, inasmuch as same could be spatially expanded by a flow medium. For a frictional engagement, the pressure body could be filled with a flow medium under a predeterminable pressure. The flow medium may be a gas, a liquid, or at least in part a liquid and otherwise gas. At any rate, in its pressure-biased state, the pressure body effects an automatic engagement, so that the compressor is rotatably driven via the belt pulley body.

The provision of the above-described pressure body thus permits a disengagement, when a defined thermal and/or mechanical load limit is exceeded. To this end, the flow medium could exhibit such a high thermal coefficient of expansion that, upon exceeding a predetermined temperature, it opens the pressure body at least in sections due to the then prevailing inside pressure, or even causes it to explode, and disengages it in this process. At any rate, this presumes that the belts slips over the belt pulley body, thereby heating it, in practice, to about 300° C., and that it transfers the temperature to the pressure body directly adjacent the inside surface of the belt pulley body. At any rate, the temperature increase leads to such an expansion of the flow medium that the pressure body leaks or even explodes, thereby allowing the pressure to escape, and discontinuing in the end the contact pressure that is applied by the pressure body and required for a forced engagement between the belt pulley body and drive shaft or coupling disk. Thus, a disengagement is realized, when a thermal load is exceeded.

Likewise, it is possible that the pressure body has at least one predetermined mechanical breaking point that is used for relieving pressure and, thus, for disengagement. To this end, a predetermined breaking point could tear, so that the pressure prevailing within the pressure body or the flow medium therein is able to escape. However, this will require that the force necessary for tearing be smaller than that force, which holds, by static friction, adhesion, or the like, the pressure body in its position relative to the coupling disk or to the vibration damper arranged therebetween. This will ensure a disengagement, when a mechanical load limit is exceeded.

Likewise, it would be possible that for purposes of relieving pressure and, thus for disengaging, the pressure body comprises at least one safety fuse, which melts regardless of a possible pressure rise within the pressure body, when a predetermined temperature is reached, and releases the pressure medium. In a particularly advantageous manner a plurality of safety fuses are provided along the circumference of the pressure body, so that irrespective of the angular position of the belt pulley or belt pulley body, at least one safety fuse is arranged in the vicinity of the region of the belt pulley, which overheats due to a slipping of the belt. At any rate, this also creates an automatic disengagement, namely by exceeding a defined thermal load limit.

Since a malfunction of the compressor can lead both to a slipping of the belt and, thus, to an enormous heating of the belt pulley body and to a total locking of the belt and, thus, to a choking of the drive engine, or even to a destruction of the belt, it will be of advantage to combine the two previously described disengagement mechanisms, namely to the extent that the pressure body may comprise for disengagement at least one predetermined mechanical breaking point serving to relieve pressure, and at least one safety fuse serving to relieve pressure. In this connection, it should be made sure that the pressure body be held in its position in a material-engaging manner, at least, however, with a high coefficient of static friction, so that the predetermined breaking point tears indeed under a corresponding mechanical load.

As regards a concrete realization of the pressure body, it will be of further advantage, when same extends annularly, preferably in the way of a hollow cylinder, between the inside surface of the belt pulley body and the outside surface of the coupling disk or a vibration damper. In other words, the pressure body extends annularly between the belt pulley body and the coupling disk, namely between the two inside surfaces of the components under discussion that are to be coupled. The vibration damper provided in this location may serve as a quasi intermediate element, but has nothing to do with engagement or disengagement in a functional respect.

In the longitudinal section of the compressor or the pressure body, same could have a substantially rectangular pressure chamber. Adjacent to this rectangular pressure chamber are outwardly directed separating regions of the pressure body, which narrow relative to the pressure chamber in the longitudinal section thereof. These separating regions have closely adjacent walls, which, due to their vicinity, are closed as a whole, in zones, or point by point, with a safety fuse. A connection of the walls in the separating regions can also be realized in the way of a predetermined breaking point.

In particular, when combining an automatic disengagement upon exceeding both a defined thermal and a defined mechanical load limit, it will be of advantage, when two opposite separating regions are formed, which adjoin the pressure chamber with their arms in U-shape in the longitudinal section of the pressure body. In this arrangement, the one separating region will serve for disengagement, when a defined thermal load limit is exceeded, and the other separating region, when a mechanical load limit is exceeded. In this connection, the one separating region is a safety fuse, and the other separating region a predetermined mechanical breaking point. Both the safety fuse and the predetermined mechanical breaking point may be provided along the entire circumference of the pressure body continuously, in zones, or only point by point.

BRIEF DESCRIPTION OF THE DRAWINGS

There now exist various possibilities of improving and further developing the teaching of the present invention. To this end, reference may be made to the following detailed description of several embodiments of the invention with reference to the drawing. In conjunction with the description of the preferred embodiments of the invention with reference to the drawing, also generally preferred embodiments and further developments of the teaching will be explained. In the drawing.

DETAILED DESCRIPTION OF THE PREFERRED EMBODIMENT

Figure 1:
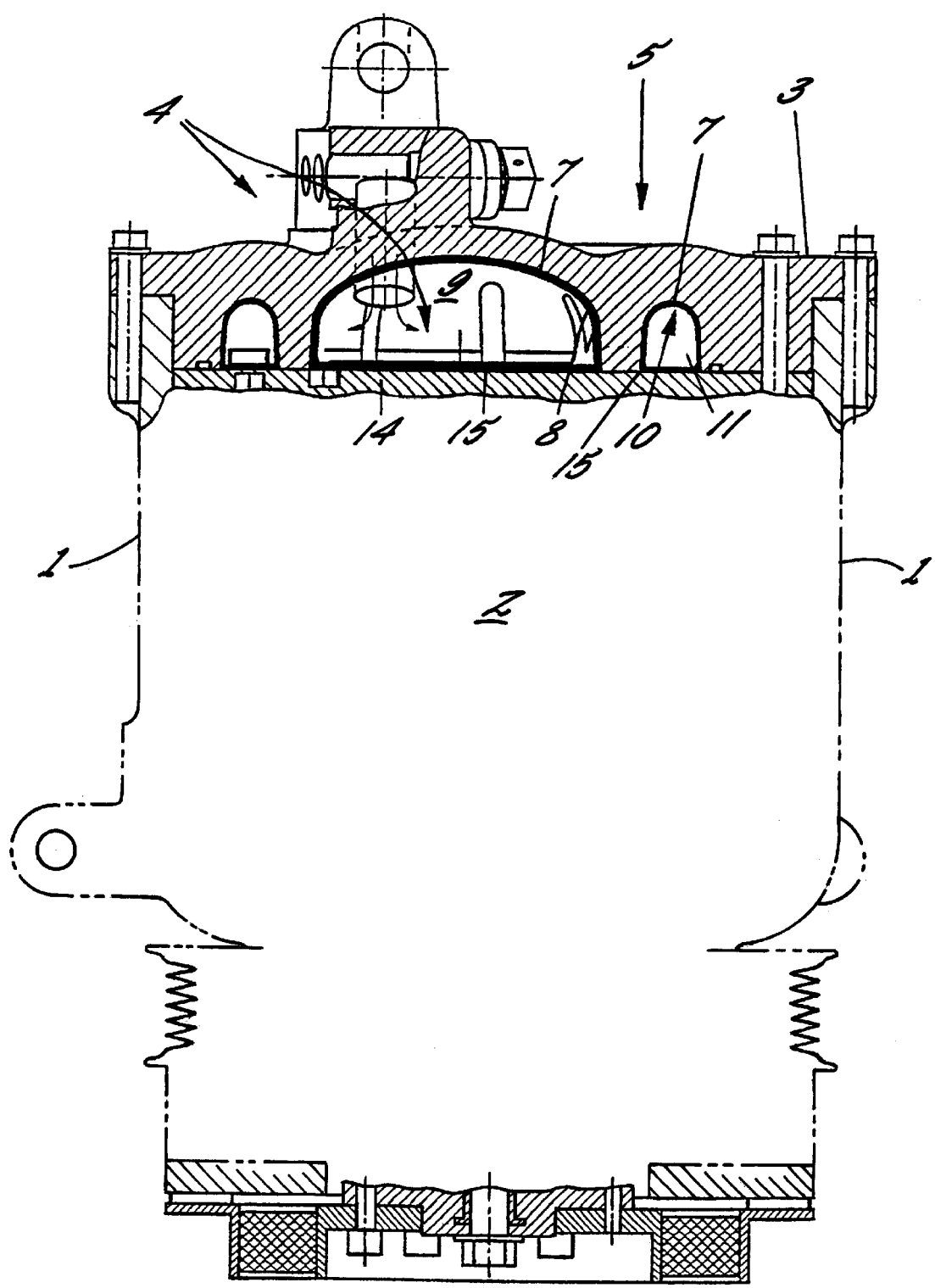
FIG. 1 is a partial and sectional schematic side view of an embodiment of a compressor according to the invention, the Figure showing only an intake area and a discharge area in a housing cover.

FIG. 1 shows a compressor for an air conditioning system of an automobile. The compressor comprises a housing 1 and a compressor unit 2 accommodated in the housing 1 for taking in and compressing a refrigerant. The refrigerant may be $CO_2$.

The refrigerant flows from an intake area 4 formed in a front-end housing cover 3 through the compressor unit 2 into a discharge area 5 likewise formed in the housing cover 3.

In accordance with the invention, components of the compressor that come into contact with the refrigerant, namely the walls that form a flow path 6 between intake area 4 and discharge area 5, are thermally insulated against the refrigerant at least in areas of contact.

In the embodiment illustrated in FIG. 1, a thermal insulation 7 is realized as a coating of a material having a low thermal conductivity. The thermal insulation 7 is provided both on the inside wall 8 of an intake channel 9 and on the inside wall 10 of a discharge channel 11. More specifically, the entire inside walls 8, 10 of the intake area 4 are coated in a thermally insulating manner. Ultimately, the entire inside walls 8, 10 of the housing cover 3 are coated to this end.

Figure 2:
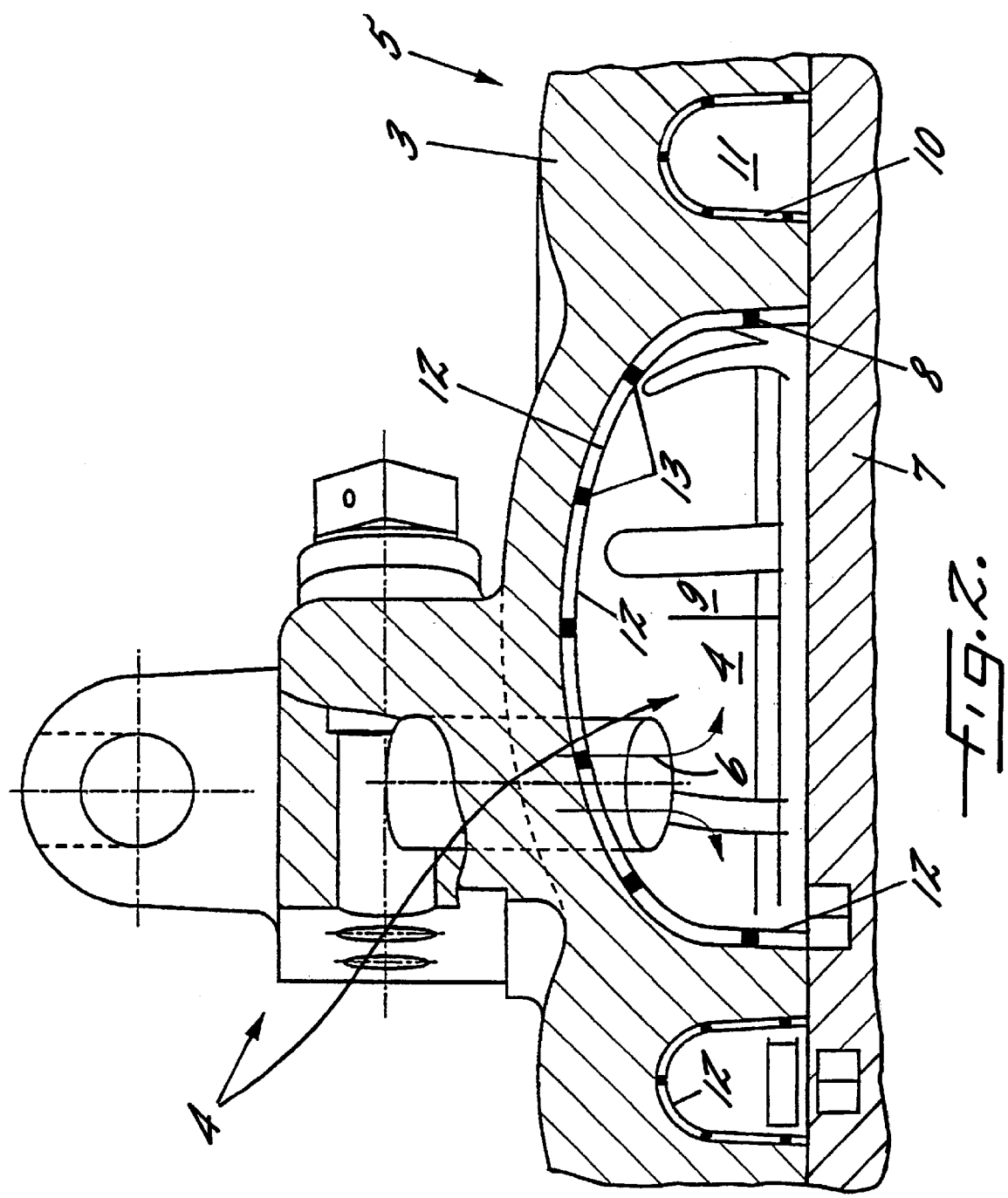
FIG. 2 is an enlarged sectional side view of the intake area in the housing cover, wherein a lining is provided as a thermal insulation in spaced relationship with the inside wall of the housing cover.

In the embodiment partially and schematically illustrated in FIG. 2, it is indicated for the intake area 4 that the inside walls 8, 10 of housing cover 3 are there lined in the form of a loose insert 12. This insert 12 is slightly spaced from the inside walls 8, 10. This spaced relationship is implemented by integral spacers 13, which lie directly against the inside walls 8, 10 of housing cover 3.

As can further be noted from FIG. 1, the housing cover 3 adjoins a valve plate 14. A thermal insulation 15 is likewise provided on valve plate 14, the latter being coated on its side facing the housing cover 3, preferably with the same material as the inside walls 8, 10 of housing cover 3. In this respect, the flow path formed between housing cover 3 and valve plate 14 is totally coated and thus thermally insulated.

With respect to the thermally insulating and wear-resistant coating of further components of the compressor, the general part of the specification is herewith incorporated by reference for purposes of avoiding repetitions. The same applies to the material of housing cover 3.

Figure 3:
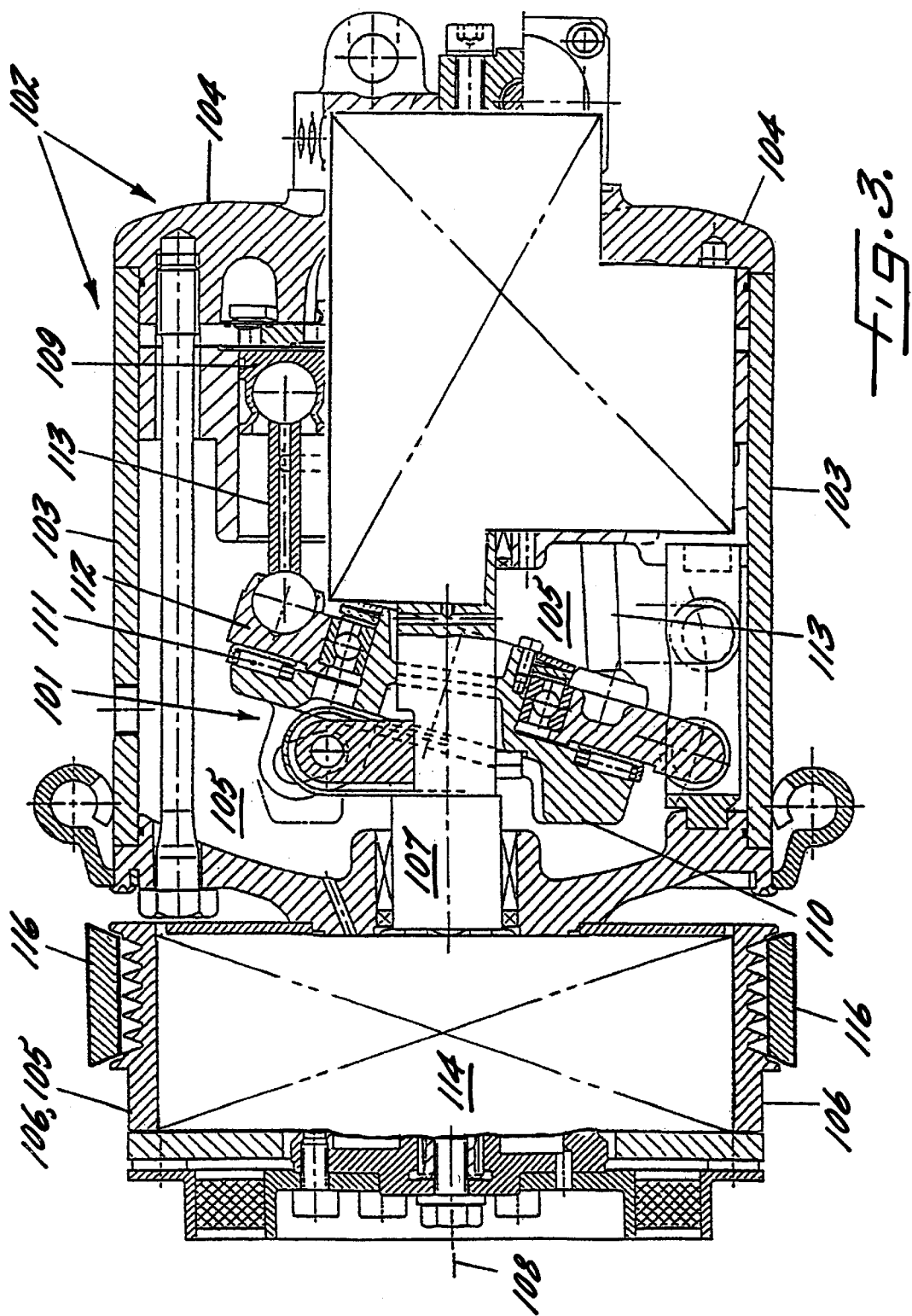
FIG. 3 is a schematic, longitudinally sectioned view of an embodiment of a species-forming compressor with the essential components.

The embodiment of a species-forming compressor as shown only by way of example in FIG. 3, is an axial piston compressor. In this embodiment, a compressor unit 101 not described in greater detail is accommodated in a housing 102. The housing 102 essentially comprises two housing parts 103, 104, with the housing part 103 forming a so-called drive chamber 105 that accommodates the compressor unit 101.

For example, an internal combustion engine drives the compressor unit 101 via a belt pulley 106. From there, the drive is effected via a drive shaft 107 that rotates about an axis of rotation 108. The drive shaft 107 is rotatably supported in the housing 102 and in the region of the belt pulley 106.

To drive pistons 109, a swash or drive plate 110 is provided which acts via bearings 111 upon a receiving disk 112 nonrotatably mounted in housing 102. The receiving disk 112 engages via a connecting rod 113 the piston or pistons 109. According to this arrangement, the piston 109 reciprocates, upon a rotation of swash plate 110, via receiving disk 112, in direction of its longitudinal axis, with the illustrated embodiment comprising a plurality of pistons 109.

Since the compressor illustrated in the Figures is a compressor for an air conditioning system of an automobile, it is driven by the internal combustion engine of an automobile not shown. In this instance, a driving moment is introduced to a drive wheel 114 of the compressor via a suitable belt pulley that connects to the crankshaft of the internal combustion engine. This drive wheel 114 comprises a belt pulley body 115, which guides a belt 116.

As indicated in the illustration of FIG. 3, the belt pulley body 115 is put into rotation by belt 116. In the embodiments of FIGS. 4–7, the torque introduced into belt pulley body 115 is transmitted via a coupling device 117 to the drive shaft 107. In the selected embodiments, the coupling device 117 comprises a vibration damper 118.

In accordance with the invention, the coupling device 117 is designed such that upon exceeding a defined thermal and/or mechanical load limit, it automatically disengages, so that the belt pulley body 115 is able to rotate unimpeded in its disengaged state.

As best seen in FIGS. 4–7, the coupling device 117 comprises a coupling element 120 that is operative between the belt pulley body 115 and drive shaft 107 or a coupling disk 119. In this arrangement, the coupling element 120 extends between the inside surface of belt pulley body 115 and the outside surface of coupling disk 119, and the two surfaces, i.e. the inside surface of belt pulley body 115 and the outside surface of coupling disk 119, are arranged in coaxial relationship with each other.

As previously stated, a vibration damper 118 for damping rotational vibrations, which is associated to the coupling device 117, is provided between the coupling element 120 and coupling disk 119, or between the two adjacent surfaces of these components. This vibration damper has nothing to do with the actual engagement and disengagement procedures.

As further shown in FIGS. 4–7, the coupling element 120 is designed and constructed in the fashion of an annularly constructed pressure body 121 for frictionally engaging the belt pulley body 115 and coupling disk 119. Concretely, the pressure body 121 is a thin-walled metal bellows, which is filled for a frictional engagement with a flow medium under a predeterminable pressure. The clamping effect caused by the pressure body 121 effects the engagement between belt pulley body 115 and coupling disk 119. In this connection, the pressure body 121 can be secured in its position by gluing, soldering, spot welding, or the like.

Figure 4:
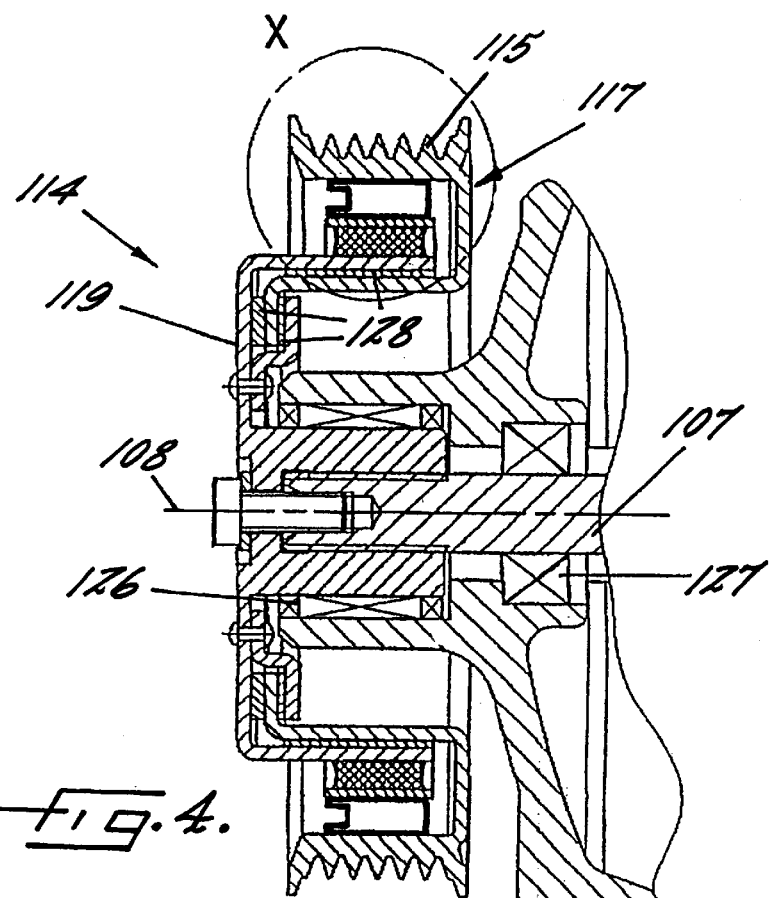
FIG. 4 is a partial, longitudinally sectioned schematic view of a further embodiment of a compressor according to the invention with a special belt pulley arrangement.
Figure 5:
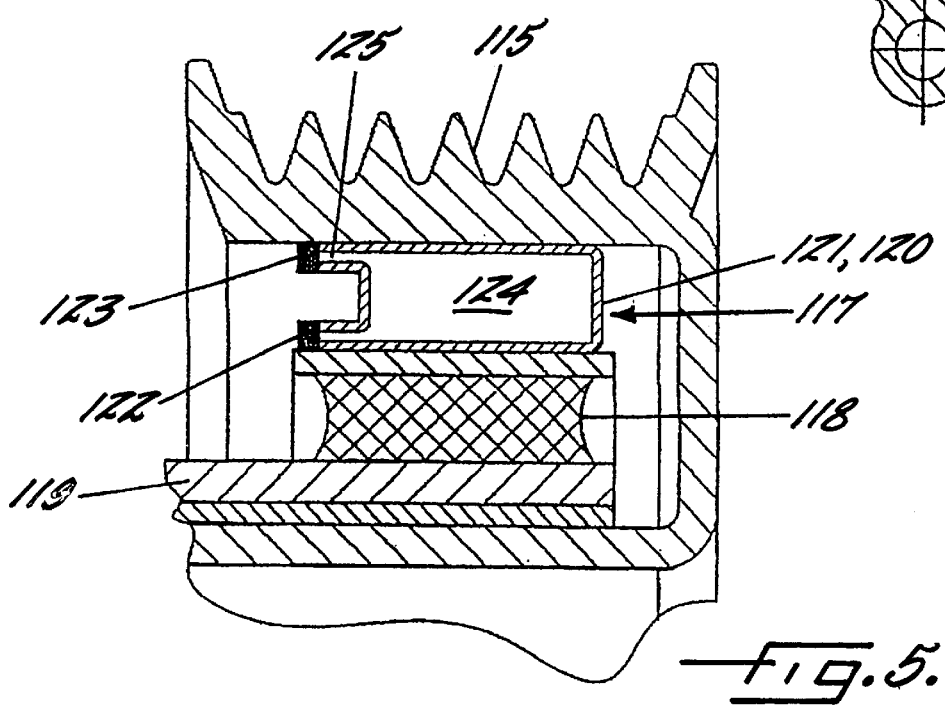
FIG. 5 is an enlarged view of detail "X" of FIG. 4.

As can be noted from the enlarged view of FIG. 5, the pressure body 121 comprises predetermined mechanical breaking points, which are used for relieving pressure and, thus, for disengagement. Likewise at these points, safety fuses 123 are provided, so that in the embodiment shown in FIGS. 4 and 5, a combination of a coupling device 117 is realized, which automatically disengages when both a defined thermal load limit and a defined mechanical load limit are exceeded.

Figure 6:
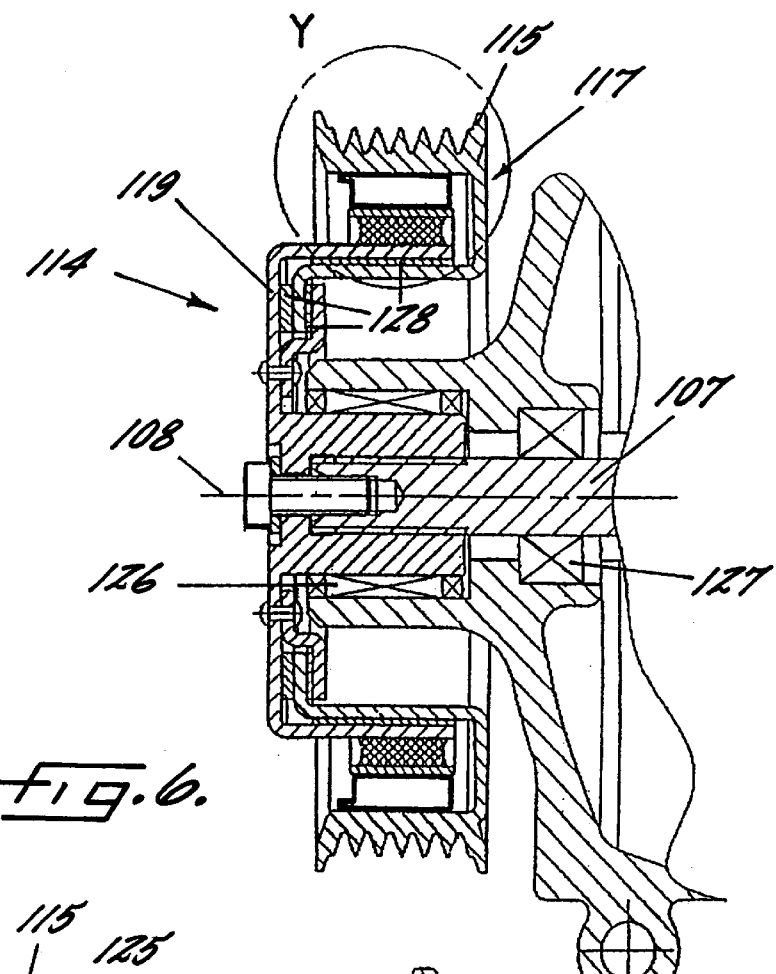
FIG. 6 is a partial, longitudinally sectioned schematic view of a further embodiment of a compressor according to the invention with a belt pulley arrangement.
Figure 7:
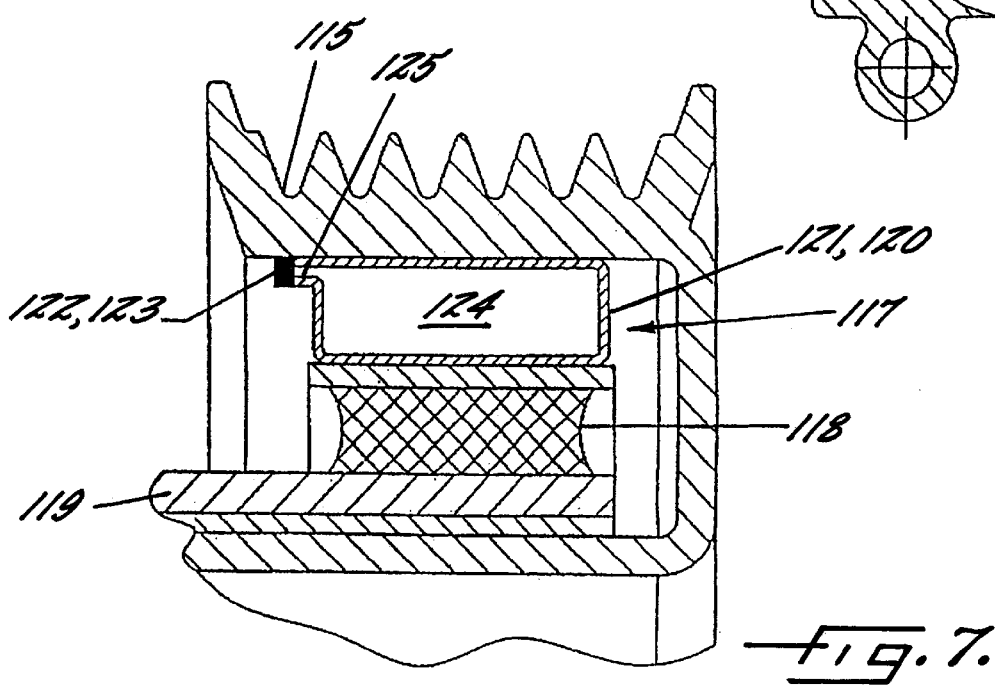
FIG. 7 is an enlarged view of detail "Y" of FIG. 6.

In the embodiment shown in FIGS. 6 and 7, the predetermined mechanical breaking points 122 and the safety fuses 123 are not located opposite to each other as in the embodiment shown in FIGS. 4 and 5, but are formed only on the side of pressure body 121 that faces the inside surface of belt pulley body 115.

Furthermore, as jointly shown in FIGS. 4–7, the pressure body 121 comprises a pressure chamber 124 substantially rectangular in its longitudinal section, and adjoining, outwardly directed separating regions 125 that cross sectionally narrow relative to the pressure chamber 124. In the embodiment shown in FIGS. 4 and 5, two separating regions are arranged in facing relationship, which connect in the longitudinal section of pressure body 121, with their arms in U-shape to the actual pressure chamber 124.

In the embodiment shown in FIGS. 6 and 7, only one side of the pressure body 121, i.e. the side facing the inside surface of belt pulley body 115, is provided with a separating region 125, which comprises both the predetermined mechanical breaking points 122 and the safety fuses 123.

Furthermore, it should be noted that, as shown in FIGS. 4 and 6, needle bearings 126 are provided, which support the drive shaft 107 outside of drive chamber 105. Moreover, the needle bearings 126 are used to support the coupling disk 119. Since the needle bearings 126 are arranged outside of the drive chamber 105, they operate under ambient atmospheric pressure, with seals 127 sealing against the drive chamber 105.

Finally, as can be noted from FIGS. 4 and 6, friction linings 128 are provided between the belt pulley body 115 and the coupling disk 119, which serve as safety bearings or as a bearing surface or bearing coating, inasmuch as, should the compressor block and a disengagement occur according to the foregoing description, the foregoing needle bearings 126 will also be inoperative. To the end that the belt pulley body 115 is able to rotate unimpeded over an acceptable period of time, for example for at least some hours, a kind of safety bearing is needed for the belt pulley body 115. This safety bearing is provided by the friction lining 128 that extends both radially and transversely. For this purpose, it is possible to use temperature-resistant materials.

As regards the operation of the realized coupling device, the general part of the specification is herewith incorporated by reference for purposes of avoiding repetitions.

Finally, it should be noted that the above-described embodiments given by way of example merely describe in greater detail the teaching of the invention, without however limiting the scope of the invention to those embodiments.

What is claimed is:

1. A compressor adapted for use with an air conditioning system of an automobile, comprising a housing and a compressor unit accommodated within the housing for taking in and compressing a refrigerant, with the housing defining a refrigerant flow path which includes an intake area and a discharge area in the housing, and with the intake area and the discharge area having interior walls which are at least partially thermally insulated, wherein the housing includes a cover, and wherein the intake area and the discharge area are at least substantially formed in said cover, wherein the thermal insulation comprises a lining or coating of a material having a low thermal conductivity, wherein the thermal insulation comprises a lining which is in the form of a separate insert, and wherein the lining is slightly spaced from the walls of the intake area and discharge area by means of spacers.

2. The compressor as defined in claim 1 wherein the lining or coating overlies substantially the entirety of the interior walls of the intake area and the discharge area.

3. The compressor as defined in claim 1 wherein the lining or coating comprises a foam material.

4. The compressor as defined in claim 1 wherein the compressor further comprises a valve plate which is adjacent the cover, and wherein the valve plate is also thermally insulated in areas which come in contact with the refrigerant.

5. The compressor as defined in claim 4 wherein the compressor unit comprises a piston pump having at least one piston which reciprocates in a cylinder of a cylinder block, and wherein at least a portion of the inside surface of the cylinder is coated with thermal insulation.

6. The compressor as defined in claim 5 wherein at least a portion of the piston is coated with a thermal insulation.

7. The compressor as defined in claim 1 wherein the cover of the housing is fabricated from a metal having a thermal conductivity lower than that of aluminum or a ceramic material.

8. The compressor as defined in claim 1 wherein the compressor unit comprises a drive shaft, a plurality of pistons mounted for reciprocation along respective longitudinal axes in a cylinder block, and with the longitudinal axes of the pistons being parallel to the drive shaft and disposed in a circular arrangement about the drive shaft, and a drive plate connected for rotation with the drive shaft for reciprocating the pistons upon rotation of the drive shaft.

9. The compressor as defined in claim 8 wherein the compressor unit further comprises a drive wheel which comprises a belt pulley body adapted to engage a drive belt, with the belt pulley body being connected to the drive shaft via a coupling device which automatically disengages when a predetermined thermal and/or mechanical load limit is exceeded.

10. The compressor as defined in claim 9 wherein the compressor unit further includes a coupling disk fixed to the drive shaft and which includes an outer cylindrical surface disposed coaxially inside of the belt pulley body, and wherein the coupling device is positioned between the belt pulley body and the outer cylindrical surface of the coupling disk.

11. The compressor as defined in claim 10 wherein the coupling device includes a vibration damper for damping rotational vibrations.

12. The compressor as defined in claim 10 wherein the coupling device comprises an annular pressure body for frictionally engaging the belt pulley body and the coupling disk.

13. The compressor as defined in claim 12 wherein the pressure body is filled with a fluid under a predetermined pressure.

14. The compressor as defined in claim 13 wherein the pressure body includes at least one mechanical breaking point for relieving the pressure and thus resulting in a disengagement of the coupling device.

15. A compressor for use with an air conditioning system of an automobile, comprising a housing and a compressor unit accommodated within the housing for taking in and compressing a refrigerant, the compressor unit comprising a drive shaft, a plurality of pistons mounted for reciprocation along respective longitudinal axes in a cylinder block, and with the longitudinal axes of the pistons being parallel to the drive shaft and disposed in a circular arrangement about the drive shaft, and a drive plate connected for rotation with the drive shaft for reciprocating the pistons upon rotation of the drive shaft, said compressor further comprising a drive wheel which comprises a belt pulley body having outer and inner cylindrical surfaces, with the outer cylindrical surface being adapted to engage a drive belt, a coupling disk fixed to the drive shaft and which includes an outer cylindrical surface disposed coaxially inside of the inner cylindrical surface of the belt pulley body, with the belt pulley body connected to the drive shaft via a coupling device which automatically disengages when a predetermined thermal and/or mechanical load limit is exceeded, and wherein the coupling device is positioned between the inner cylindrical surface of the belt pulley body and the outer cylindrical surface of the coupling disk, and wherein the coupling device comprises an annular pressure body for frictionally engaging the belt pulley body and the coupling disk.

16. The compressor as defined in claim 15 wherein the coupling device further includes a vibration damper for damping rotational vibrations.

17. The compressor as defined in claim 15 wherein the pressure body is filled with a fluid under a predetermined pressure.

18. The compressor as defined in claim 17 wherein the pressure body includes at least one mechanical breaking point for relieving the pressure and thus resulting in a disengagement of the coupling device.

* * * * *